US009933080B2

(12) United States Patent
Rickis et al.

(10) Patent No.: US 9,933,080 B2
(45) Date of Patent: Apr. 3, 2018

(54) PRESSURE-REGULATING VALVES

(71) Applicant: Hamilton Sundstrand Corporation, Charlotte, NC (US)

(72) Inventors: Aaron F. Rickis, Feeding Hills, MA (US); Gary R. Marconi, New Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 14/664,533

(22) Filed: Mar. 20, 2015

(65) Prior Publication Data
US 2016/0273667 A1    Sep. 22, 2016

(51) Int. Cl.
*F16K 31/12*    (2006.01)
*F16K 17/02*    (2006.01)
*G05D 16/20*    (2006.01)
*G05D 16/02*    (2006.01)

(52) U.S. Cl.
CPC ............. *F16K 17/02* (2013.01); *G05D 16/02* (2013.01); *G05D 16/2013* (2013.01)

(58) Field of Classification Search
CPC ......... Y10T 137/7804; Y10T 137/7805; Y10T 137/7806; Y10T 137/7833; Y10T 137/86292; F16K 17/02; G05D 16/2013; G05D 16/16
See application file for complete search history.

(56) References Cited

U.S. PATENT DOCUMENTS

| 1,567,995 | A | * | 12/1925 | Kimball | G05D 16/202 137/487.5 |
|---|---|---|---|---|---|
| 1,800,352 | A | * | 4/1931 | Klees | G05D 23/275 137/500 |
| 1,860,516 | A | * | 5/1932 | Thomas | G05D 7/0193 137/100 |
| 2,199,728 | A | * | 5/1940 | Overson | F22D 11/00 116/276 |
| 2,225,916 | A | | 12/1940 | Maglot | |
| 2,853,268 | A | * | 9/1958 | Hughes | G05D 16/0655 137/505.18 |
| 3,762,435 | A | * | 10/1973 | Auwerter | F16K 31/363 137/505.22 |

(Continued)

FOREIGN PATENT DOCUMENTS

| EP | 0229853 A1 | 7/1987 |
|---|---|---|
| GB | 2158616 A | 11/1985 |
| GB | 2333863 A | 8/1999 |

OTHER PUBLICATIONS

Extended European Search Report dated Aug. 3, 2016, issued during the prosecution of European Patent Application No. 16161247.8 (7 pages).

*Primary Examiner* — Jessica Cahill
(74) *Attorney, Agent, or Firm* — Locke Lord LLP; Scott D. Wofsy; Alicia J. Carroll

(57) ABSTRACT

A multi-bend control circuit for fluid communication with an outlet port of a valve includes a first circuit leg extending in a first direction and a second circuit leg extending at an angle from the first circuit leg in a second direction. A third circuit leg extends at an angle from the second circuit leg in a third direction different from the second direction. A sense line tap is in fluid communication with at least one of the first, second or third legs.

4 Claims, 1 Drawing Sheet

(56) References Cited

U.S. PATENT DOCUMENTS 4,044,792 A * 8/1977 Kjaergaard ........ G05D 16/0655
137/505.22
5,230,362 A    7/1993  Goodman
5,735,308 A    4/1998  Yokota et al.

* cited by examiner

PRESSURE-REGULATING VALVES

BACKGROUND OF THE INVENTION

1. Field of the Invention

The present invention relates to valves, and, in particular, to pressure-regulating valves.

2. Description of Related Art

Traditional pressure-regulating valves used in various pumps can sometimes experience instability, potentially resulting in pump and valve failure, for example instability due to contamination. Additionally, traditional valves can sometimes experience high droop, which can cause wear on the pumping elements. Droop is a term for the relationship between outlet pressure and flow rate. Flat droop indicates little to no change in outlet pressure as the flow rate increases and positive droop would indicate a gain in outlet pressure as the flow rate increases. Generally, the desired droop characteristic of the valve would be negative, meaning the valve sets a desired pressure for low-flow scenarios, and that pressure then reduces during high-flow scenarios, when other loads (e.g. centrifugal) are increasing on the pump. However, the traditional configuration used to achieve negative droop tends not to be prone to contamination. Maintenance is therefore required to alleviate the contamination. There are also scenarios in which flat or positive droop may be desired.

Such conventional methods and systems have generally been considered satisfactory for their intended purposes. However, there is still a need in the art for systems and methods that allow for improved regulating valves. The present invention provides a solution for these needs.

SUMMARY OF THE INVENTION

A multi-bend control circuit for fluid communication with an outlet port of a valve includes a first circuit leg extending in a first direction and a second circuit leg extending at an angle from the first circuit leg in a second direction. A third circuit leg extends at an angle from the second circuit leg in a third direction different from the second direction. A sense line tap is in fluid communication with at least one of the first, second or third legs.

In accordance with embodiments, the second direction is perpendicular to the first direction. The third direction can be perpendicular to the second direction, and/or at an angle with respect to the first direction. The third direction can be oblique to a plane defined by the first and second directions. A portion of the second circuit leg can extend beyond the intersection of the second circuit leg and the third circuit leg. The first circuit leg can have an inlet. The sense line tap can be in fluid communication with at least one of the first, second or third legs at a point that has a pressure less than that of the inlet of the first circuit leg.

A pressure valve includes a valve body having a first end and a second end defining a longitudinal axis therebetween. The valve body includes an inlet port, an outlet port and a sense port. All ports are in fluid communication with the valve body to regulate pressure at the outlet port based on pressure at the sense port. The pressure valve includes the multi-bend control circuit, as recited above. The multi-bend control circuit is in fluid communication with the outlet port and the sense port. The first circuit leg extends from the outlet port. The pressure valve includes a sense line fluidly connecting the sense port and the sense line tap of the multi-bend control circuit described above. It is contemplated that the sense line tap can be in fluid communication with at least one of the first, second or third legs at a point that has a pressure less than that of the outlet port.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
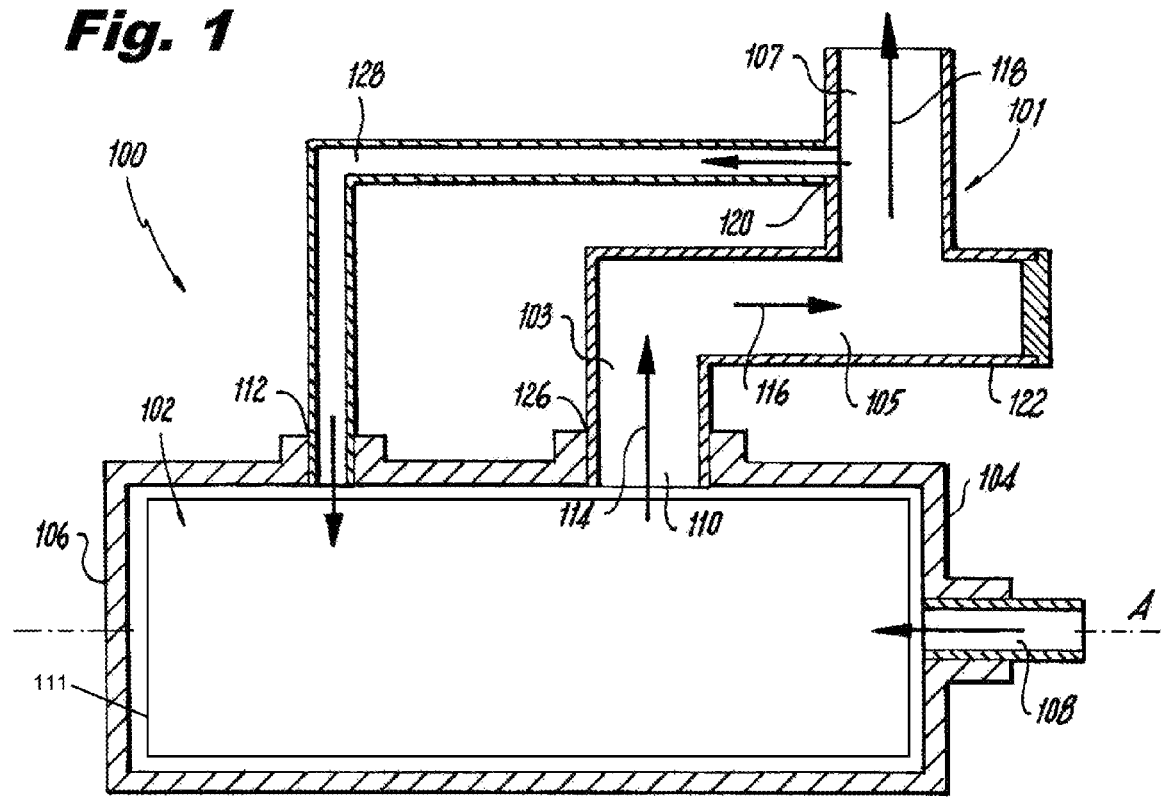
FIG. 1 is a schematic view of an exemplary embodiment of a pressure-regulating valve constructed in accordance with the present disclosure, showing the valve connected to a multi-bend control circuit.

Reference will now be made to the drawings wherein like reference numerals identify similar structural features or aspects of the subject disclosure. For purposes of explanation and illustration, and not limitation, a schematic view of an exemplary embodiment of a pressure-regulating valve in accordance with the disclosure is shown in FIG. 1 and is designated generally by reference character 100. Other embodiments of pressure-regulating valves in accordance with the disclosure, or aspects thereof, are provided in FIG. 2, as will be described. The embodiments of pressure regulating valve 100 and aspects thereof are able to control the valve's backside pressure to achieve positive, negative, or flat droop performance depending on where the sense line is located, allowing valve performance to be tuned, without adding increased complexity to the valve itself.

As shown in FIG. 1, a pressure regulating valve 100 includes a valve body 102 having a first end 104 and a second end 106 defining a longitudinal axis A therebetween, and including pressure regulating components 111. Valve body 102 includes an inlet port 108, an outlet port 110 and a sense port 112. All ports are in fluid communication with valve body 102 to regulate pressure at outlet port 110 based on pressure at sense port 112. Pressure valve 100 includes a multi-bend control circuit 101 for fluid communication with outlet port 110 of valve 100. Multi-bend control circuit 101 is in fluid communication with outlet port 110 and sense port 112

Figure 2:
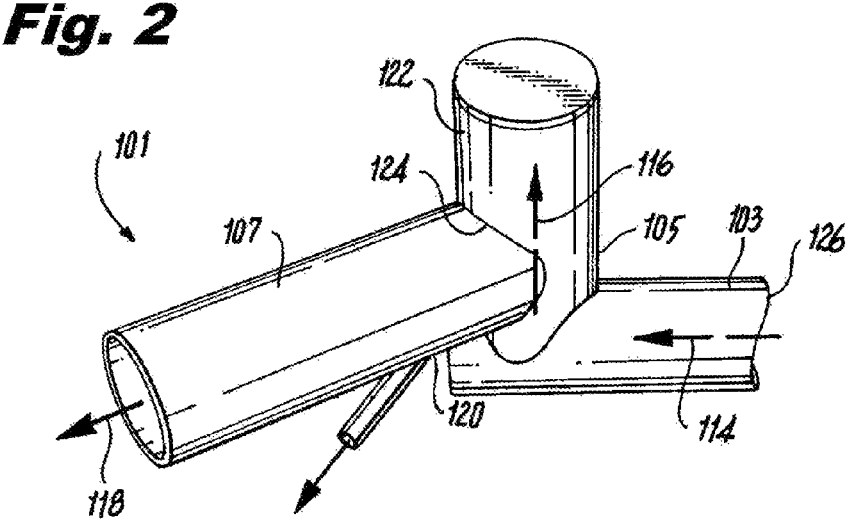
FIG. 2 is a perspective view of the multi-bend control circuit of FIG. 1, showing the first and third circuit legs with the second circuit leg connecting therebetween.

With reference now to FIGS. 1 and 2, multi-bend control circuit 101 includes a first circuit leg 103 extending in a first direction from outlet port 110, schematically shown by arrow 114, and a second circuit leg 105 extending at an angle from first circuit leg 103 in a second direction, schematically shown by arrow 116. A third circuit leg 107 extends at an angle from second circuit leg 105 in a third direction, schematically shown by arrow 118, different from second direction 116. A sense line tap 120 is in fluid communication with third leg 107. Pressure valve 100 includes a sense line 128 fluidly connecting sense port 112 and sense line tap 120.

As shown in FIG. 2, first circuit leg 103 has an inlet 126. Sense line tap 120 is in fluid communication with third circuit leg 107 at a point that has a pressure less than that of inlet 126 of first circuit leg 103, and less than that of outlet port 110. Instead of the traditional straight flow path, multi-bend control circuit 101 creates a sigmoidal flow path downstream of outlet port 110. Multi-bend control circuit 101 directs the flow through multiple bends creating low-pressure regions within the circuit 101 during high-flow scenarios, e.g. 10,000 lb/hr (1.26 kg/s) to 30,000 lb/hr (3.78 kg/s). By placing sense line tap 120 into the underside of third circuit leg 107, backside pressure drops as flow increases, leading to negative valve droop. Negative valve droop is sometimes required during high-flow scenarios to reduce wear on pumping components, therein increasing component life.

With continued reference to FIG. 2, second direction 116 is perpendicular to first direction 114. Third direction 118 is perpendicular to second direction 116 and at an angle with respect to first direction 114. Third direction 118 is oblique with respect to a plane defined by first direction 114 and second direction 116. It is also contemplated that first, second and third directions can all be defined in a common plane. A capped portion 122 of second circuit leg 105 extends beyond the intersection 124 of second circuit leg 105 and third circuit leg 107 to accommodate for the machining, e.g. drilling, of multi-bend circuit 101 during manufacture. Those skilled in the art will readily appreciate that first and third circuit legs 103 and 107, respectively, can also extend beyond their respective intersections with second circuit leg 105, depending on drill start location. It is also contemplated that these extensions, e.g. capped portion 122, would not exist for any of circuit legs 103, 105 or 107, for example, if multi-bend circuit 101 is manufactured by casting.

It is contemplated that the sense line tap 120 can be placed in a variety of different locations throughout multi-bend control circuit 101 depending on the desired performance result. A variety of different valve performance characteristics can be achieved depending on the placement of sense line tap 120, for example, positive droop and/or relatively flat droop. This is due to the 3-D pressure gradient that exists in the legs 103, 105 and 107 of multi-bend control circuit 101.

The methods and systems of the present disclosure, as described above and shown in the drawings, provide for pressure-regulating valves with superior properties including tunable droop characteristics without increased valve complexity. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A pressure valve comprising:
    a valve body having a first end and a second end defining a longitudinal axis therebetween, the valve body including an inlet port, an outlet port and a sense port, wherein all ports are in fluid communication with the valve body to regulate pressure at the outlet port based on pressure at the sense port, wherein the sense port is in direct fluid communication with the valve body;
    a multi-bend control circuit in fluid communication with the outlet port and the sense port, wherein the multi-bend control circuit includes:
        a first circuit leg extending from the outlet port in a first direction;
        a second circuit leg extending at an angle from the first circuit leg in a second direction;
        a third circuit leg extending at an angle from the second circuit leg in a third direction different from the second direction, wherein the first, second and third circuit legs form a sigmoidal flow path extending from and flowing away from the outlet port;
        a sense line tap in fluid communication with at least one of the first, second or third legs at a point that has a pressure less than that of the outlet port, wherein the sense line tap is positioned upstream from an outlet of the third circuit leg; and
        a sense line fluidly connecting the sense port and the sense line tap, wherein the third direction is oblique with respect to a plane defined by the first and second directions.

2. A pressure valve as recited in claim 1, wherein the second direction is perpendicular to the first direction.

3. A pressure valve as recited in claim 1, wherein a portion of the second circuit leg extends beyond the intersection of the second circuit leg and the third circuit leg.

4. A pressure valve as recited in claim 1, wherein the first circuit leg has an inlet, and wherein the sense line tap is in fluid communication with at least one of the first, second or third legs at a point that has a pressure less than that of the inlet of the first circuit leg.

* * * * *